US011489902B2

(12) United States Patent
 Zhou

(10) Patent No.: US 11,489,902 B2
(45) Date of Patent: Nov. 1, 2022

(54) METHOD FOR RETRANSMITTING LOST NETWORK PACKET BASED ON TRANSPORT STREAM FORMAT AND USER DATAGRAM PROTOCOL

(71) Applicant: Amlogic (Shenzhen), Ltd., Shenzhen (CN)

(72) Inventor: Maolin Zhou, Shenzhen (CN)

(73) Assignee: AMLOGIC (SHENZHEN), LTD., Shenzhen (CN)

( * ) Notice: Subject to any disclaimer, the term of this patent is extended or adjusted under 35 U.S.C. 154(b) by 0 days.

(21) Appl. No.: 17/138,756

(22) Filed: Dec. 30, 2020

(65) Prior Publication Data
 US 2021/0120068 A1 Apr. 22, 2021

Related U.S. Application Data

(63) Continuation of application No. PCT/CN2020/111639, filed on Aug. 27, 2020.

(30) Foreign Application Priority Data

Sep. 9, 2019 (CN) .......................... 201910848653.8

(51) Int. Cl.
 *H04L 65/80* (2022.01)
 *H04L 1/16* (2006.01)
 (Continued)

(52) U.S. Cl.
 CPC ............ *H04L 65/80* (2013.01); *H04L 1/1621* (2013.01); *H04L 65/65* (2022.05); *H04L 65/70* (2022.05);
 (Continued)

(58) Field of Classification Search
 CPC ..... H04N 19/89–895; H04N 19/65–69; H04N 21/6437; H04L 1/004–0077;
 (Continued)

(56) References Cited

U.S. PATENT DOCUMENTS 6,026,506 A * 2/2000 Anderson ............. H04L 1/0045
  348/E5.005
8,683,542 B1 * 3/2014 Henry ................... H04L 65/601
  725/146
(Continued)

FOREIGN PATENT DOCUMENTS

CN 101656747 A 2/2010
CN 102835058 A 12/2012
(Continued)

OTHER PUBLICATIONS

A. S. García, J. Ott, M. Ellis and C. Perkins, "Virtual RTCP: A case study of monitoring and repair for UDP-based IPTV systems," 2012 19th International Packet Video Workshop (PV), 2012, pp. 47-52, doi: 10.1109/PV.2012.6229743. (Year: 2012).*
(Continued)

*Primary Examiner* — Glenton B Burgess
*Assistant Examiner* — Julian Chang

(57) ABSTRACT

The present disclosure provides a method for retransmitting at least one lost network packet based on a transport stream (TS) format and an user datagram protocol (UDP), including: receiving a plurality of media packets having the TS format by a terminal from a media server via the UDP, determining whether continuity counter (CC) fields of the media packets is continuous, transmitting a transmission request packet to a media retransmission server by the terminal via the UDP, wherein the media retransmission server is configured to analyze the retransmission request packet to obtain a least one lost media packet having the TS format, packaging the at least one lost media packet into a retransmission acknowledge packet by the media retransmission server, and transmitting the retransmission acknowledge packet from the media retransmission server to the terminal via the UDP.

18 Claims, 3 Drawing Sheets

(51) Int. Cl.
  *H04L 65/65* (2022.01)
  *H04L 65/70* (2022.01)
  *H04N 21/6437* (2011.01)
  *H04N 19/89* (2014.01)
  *H04L 69/164* (2022.01)
(52) U.S. Cl.
  CPC ............ *H04L 69/164* (2013.01); *H04N 19/89* (2014.11); *H04N 21/6437* (2013.01)
(58) Field of Classification Search
  CPC ......... H04L 1/00–248; H04L 65/00–80; H04L 69/16–169; H03M 13/05–21
  See application file for complete search history.

(56) References Cited

U.S. PATENT DOCUMENTS

| | | | |
|---|---|---|---|
| 9,461,895 B1* | 10/2016 | Kardatzke | H04L 43/16 |
| 2003/0120802 A1* | 6/2003 | Kohno | H04L 65/1101 |
| | | | 709/237 |
| 2003/0126238 A1* | 7/2003 | Kohno | H04L 65/756 |
| | | | 375/E7.025 |
| 2004/0017774 A1* | 1/2004 | Tapie | H04L 1/1657 |
| | | | 370/235 |
| 2005/0169199 A1* | 8/2005 | Futenma | H04L 47/2416 |
| | | | 370/282 |
| 2006/0282749 A1* | 12/2006 | Guo | H04L 1/0061 |
| | | | 714/776 |
| 2006/0291452 A1* | 12/2006 | Velagaleti | H04L 1/1671 |
| | | | 370/352 |
| 2007/0234385 A1* | 10/2007 | Bopardikar | H04N 21/43615 |
| | | | 725/38 |
| 2007/0237185 A1 | 10/2007 | Pereira | |
| 2007/0242080 A1* | 10/2007 | Hamada | G09G 5/006 |
| | | | 345/606 |
| 2008/0062990 A1* | 3/2008 | Oran | H04L 1/1607 |
| | | | 370/392 |
| 2008/0282310 A1* | 11/2008 | Koppelaar | H04L 1/0057 |
| | | | 725/118 |
| 2009/0041115 A1* | 2/2009 | Ramesh | H04L 45/745 |
| | | | 375/240.01 |
| 2010/0091801 A1* | 4/2010 | Itakura | H04L 1/1854 |
| | | | 370/475 |
| 2011/0119546 A1* | 5/2011 | Ver Steeg | H04L 65/765 |
| | | | 714/748 |
| 2012/0257492 A1* | 10/2012 | Henry | H04L 1/18 |
| | | | 370/216 |
| 2012/0278845 A1* | 11/2012 | Ou | H04L 1/1887 |
| | | | 725/93 |
| 2013/0125189 A1* | 5/2013 | Ruiz Alonso | H04L 65/611 |
| | | | 725/110 |
| 2013/0182557 A1* | 7/2013 | Zhang | H04N 21/6408 |
| | | | 370/216 |
| 2015/0100634 A1* | 4/2015 | He | H04L 65/765 |
| | | | 709/204 |
| 2017/0111249 A1* | 4/2017 | Hardt | H04L 43/16 |
| 2021/0314631 A1* | 10/2021 | Bâle | H04N 21/6408 |

FOREIGN PATENT DOCUMENTS

| | | | | |
|---|---|---|---|---|
| CN | 103685243 A | | 3/2014 | |
| CN | 102835058 B | * | 8/2015 | ........... H04L 1/1877 |
| CN | 106303752 A | | 1/2017 | |
| CN | 110730053 A | | 1/2020 | |
| JP | 4134516 B2 | * | 8/2008 | ............. H04H 20/38 |
| KR | 20180027281 A | | 3/2018 | |
| WO | WO-2020109834 A1 | * | 6/2020 | ........... H04L 65/103 |

OTHER PUBLICATIONS

Joo, Hyunchul, et al. "An Effective Packet Loss Recovery Scheme Using a Cache Server in IPTV Multicast Service." 2020 6th IEEE Congress on Information Science and Technology (CiSt). IEEE, 2021. (Year: 2021).*

* cited by examiner

METHOD FOR RETRANSMITTING LOST NETWORK PACKET BASED ON TRANSPORT STREAM FORMAT AND USER DATAGRAM PROTOCOL

CROSS REFERENCE TO RELATED APPLICATIONS

The present application is a continuation-application of International Application PCT/CN2020/111639, with an international filing date of Aug. 27, 2020, which claims foreign priority of Chinese Patent Application No. 201910848653.8, filed on Sep. 9, 2019 in the State Intellectual Property Office of China, the contents of all of which are hereby incorporated by reference.

BACKGROUND

1. Technical Field

The present disclosure relates to communication field, and particularly to a method for retransmitting lost network packets based on a transport stream (TS) format and an user datagram protocol (UDP).

2. Description of Related Art

In the inter protocol television (IPTV) media system, most of the transmission of the packet is UDP transmission. The UDP transmission is a connectionless transmission, thus the loss of the network packet may often occur. The loss of the network packet will cause the terminal to fail to receive the complete media packet, which may result in the stutter and blurry screen of the IPTV terminal, and may greatly affect the viewing of the programs.

The retransmission of the lost network packets based on the application layer is to guarantee the terminal to receive the complete media packet by requesting the media server to retransmit the lost network packets. Thereby ensuring the playback of media and improving the user experience in the case of poor network quality.

In the current IPTV system, the method for retransmitting the lost packets of the application layer is basically implemented based on the real-time transport protocol (RTP).

The terminal may judge whether there is a loss of the packet according to the continuity of the "Seq" of the received RTP. For example, if the terminal receives RTP media packets with "Seq" of 1, 3, 4 and 5 in sequence, it can be determined that the packet with "Seq" being equal to 2 is lost during transmission. At this time, the terminal may send a request to the media server to retransmit the RTP media packet with "Seq" being equal to 2. The terminal may receive the retransmitted RTP media packet with "Seq" being equal to 2 from the media server, and the terminal receives the complete RTP media packets with "Seq" of 1, 2, 3, 4 and 5 sent by the media server.

However, in the actual IPTV system, not all of the media transmission use RTP mode, it may adopt UDP transmission with a transport stream (TS) format. The TS format has a continuity counter (CC) field which is similar to the "Seq" of RTP. The CC field is continuous under normal circumstances, thus the loss of the packet may be determined by checking the continuity of the CC field. But because the CC field only has four bits, which in a range of 0-15, and the value of this range is too small, therefore, the different TS media packet with the same CC field may easily appear in the network. Therefore, in addition to the CC field, it may need other methods to identify a unique TS media packet so as to prevent the server from judgment errors of the loss of the packet. It is necessary to find a method for retransmitting the lost packets based on TS format and UDP transmission to improve network quality and user experience under the poor networking conditions.

DETAILED DESCRIPTION

In order to explain the technical solution of the present disclosure more clearly and completely, the present disclosure will be further described with reference to the accompanying drawings.

Figure 1:
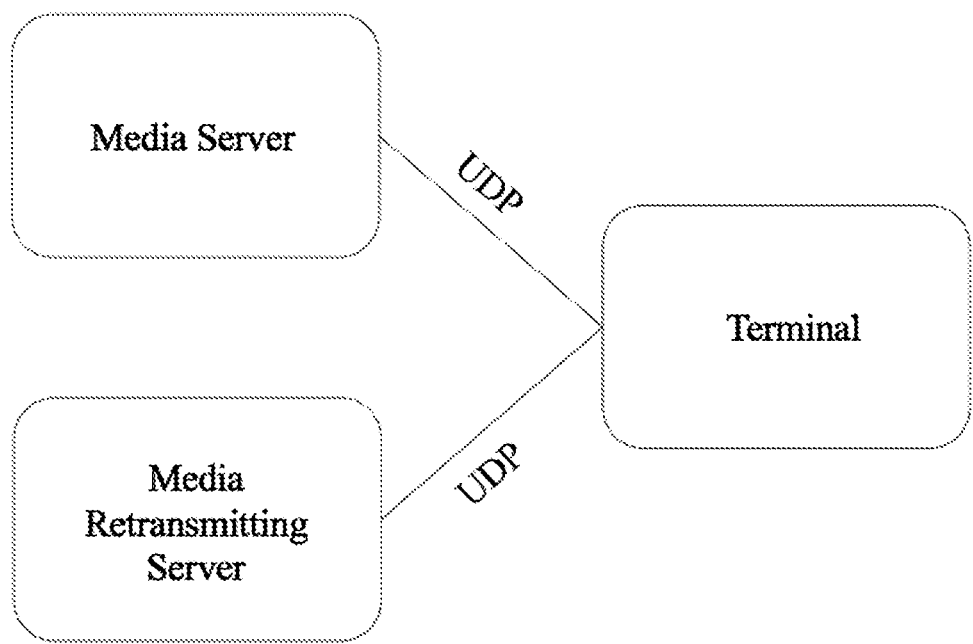
FIG. 1 is a schematic view of a method for retransmitting lost network packets based on a TS format and an UDP in accordance with one embodiment of a present disclosure.

FIG. 1 is a schematic view of a method for retransmitting lost network packets based on a TS format and an UDP, and the method includes the following steps.

S1: receiving a plurality media packets having transport stream (TS) format from a media server by a terminal via a user datagram protocol (UDP).

S2: determining whether continuity counter (CC) fields of the media packets having TS format is continuous, wherein if the CC field is not continuous, the terminal determines there is a loss in the media packets having TS format transmitting by the media server via the UDP.

S3: transmitting a transmission request packet to a media retransmission server by the terminal via the UDP, wherein the media retransmission server is configured to analyze the retransmission request packet to obtain a least one lost media packet having the TS format.

S4: packaging the at least one lost media packet into a retransmission acknowledge packet by the media retransmission server, and transmitting the retransmission acknowledge packet from the media retransmission server to the terminal via the UDP.

The retransmission request packet includes a portion of or all of the content of the TS format media packets received by the terminal. The media retransmission server is configured to determine at least on lost TS format media packet via the content and the CC field of the TS format media packets.

In step 2, the terminal is configured to check the continuity of the CC fields of the TS format media packets. If the CC field is continuous, the terminal determines that the TS format media packets transmitted by the media server via the UDP has no lost packet, and there is no need to proceed to the step S3.

In one embodiment, the retransmission request packet includes a portion or all of the content of the TS format media packets received by the terminal, which must include the CC field of the TS format media packets. The media retransmission server is configured to determine the lost TS format media packets via the content and the CC field of the TS format media packets. But because the CC field only has 4 bits in length and the range of 0-15, when the value of the CC field exceeds 15, it may wrap around and become 0 again. For example, when the retransmission request packet illustrates that the CC fields of the TS format media packets received by the media terminal are 15, 0, 1, 2, 3, 6 and 9, the media retransmission server may determine that the lost packets are the packets having the CC field of 4, 5, 7 and 8 according the content and the CC field of the retransmission request packet. The media retransmission server is configured to package TS format media packets with CC fields of 4, 5, 7 and 8 into the retransmission response and transmit the retransmission response to the terminal. Such that the method for retransmitting the lost network packets based on the TS format and the UDP may enable the media retransmission server to accurately determine the lost TS format media packets in the terminal by the retransmission request packet, thereby solving the problem of loss of the packet in the transmission of the TS format media packets via the UDP.

Figure 2:
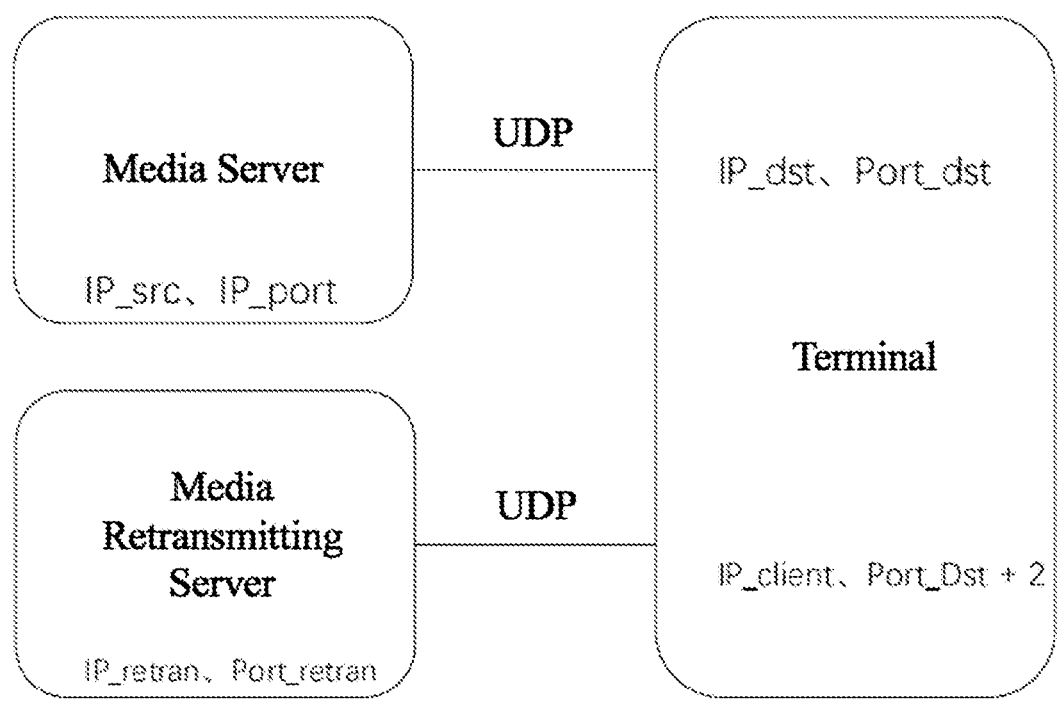
FIG. 2 is a schematic view illustrating a connection of a media server and a media retransmission server configured on different servers in accordance with one embodiment of a present disclosure.

FIG. 2 is a schematic view illustrating a connection of a media server and a media retransmission server configured on different servers in accordance with one embodiment of a present disclosure.

In one embodiment, the address and the port of the media server are IP_src and IP_port, and the address and the port of the terminal for receiving the media server are IP_dst and Port_dst. The address and the port of the terminal for transmitting the retransmission request packet are IP_client and Port_Dst+2. The address and the port of the retransmission media server are IP_retran and Port_retran. The terminal communicates with the media server through the address IP_dst and the port Port_dst, and the media terminal communicates with the media retransmission server through the address IP_client and port Port_Dst+2. The retransmission request packet transmitted by the terminal may include ("REQU", Seq, IP_dst, Port_dst, IP_client, Port_Dst+2, TS Packet N-2, TS Packet N-1 and TS Packet N+7). The "REQU" field represents the retransmission request packet. "Seq" is the number of times that the terminal transmits the retransmission request packet to the media retransmission server. "TS Packet N-2", "TS Packet N-1" and "TS Packet N+7" are a portion or all of the TS format media packets received by the terminal.

When the media retransmission server receives the retransmission request packet, the media retransmission server is configured determine that the lost TS format media packets are the media packets having the CC field of N, N+1, N+2, N+3, N+4, N+5 and N+6 according to the content and the CC field in the retransmission request packet. The TS format media packets with the CC field of N, N+1, N+2, N+3, N+4, N+5 and N+6 are packaged into the retransmission acknowledge packet and transmitted to the terminal. The retransmission acknowledge packet may include ("RESP", ACK Seq, Retran Total PacketNums, Current Retran PacketNum, TS Packet N, TS Packet N+1, TS Packet N+2, TS Packet N+3, TS Packet N+4, TS Packet N+5 and TS Packet N+6). The "RESP" field represents the retransmission acknowledge packet. "ACK Seq" is the acknowledge packet to "Seq", and the value of "ACK Seq" is equal to the value of "Seq."

"Retran Total PacketNums" indicates the number of the segments of the retransmission acknowledge packet needs to be divided into in response to the retransmission request in order to be completely transmitted to the media terminal. "Current Retran PacketNum" represents the current number of "Retran Total PacketNums." "TS Packet N, TS Packet N+1, TS Packet N+2, TS Packet N+3, TS Packet N+4, TS Packet N+5 and TS Packet N+6" are the complete TS format media packets.

Figure 3:
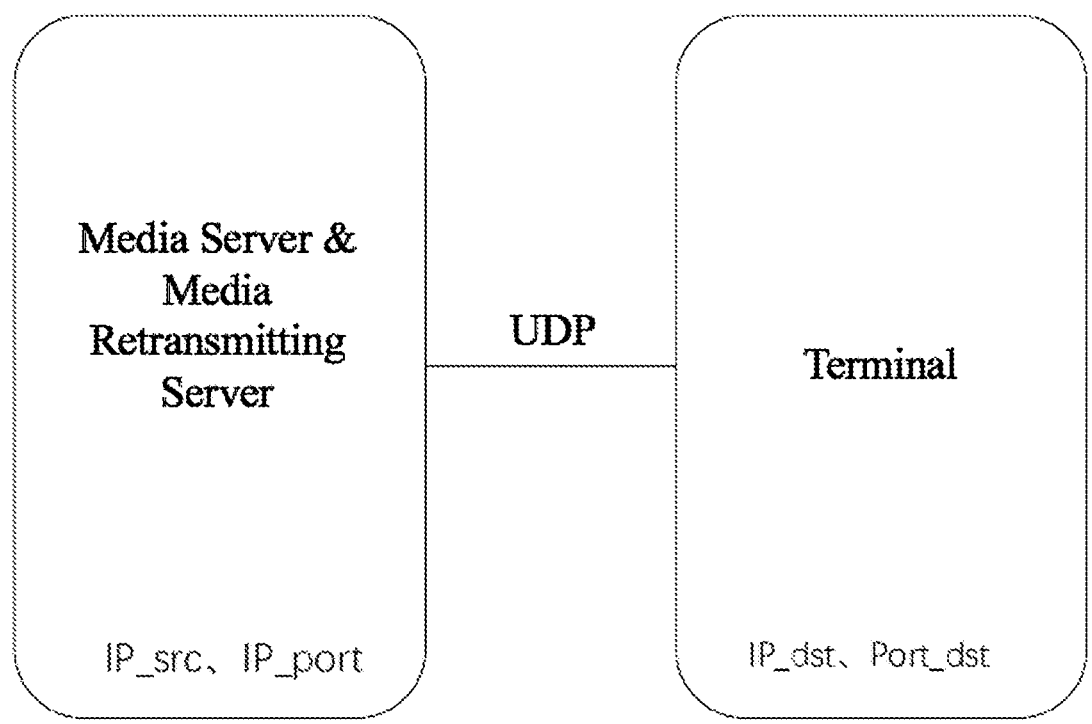
FIG. 3 is a schematic view illustrating a connection of a media server and a media retransmission server configured on the same server in accordance with one embodiment of a present disclosure.

FIG. 3 is a schematic view illustrating a connection of a media server and a media retransmission server configured on the same server in accordance with one embodiment of a present disclosure.

In one embodiment, the address and the port of the media server are IP_src and IP_port. The media retransmission server and the media server may adopt the same address and port. The address and the port of the terminal are IP_dst and Port_dst, and the address and the port that the terminal communicates with the media server and the media retransmission server are IP_dst and Port_dst.

The present disclosure can also have many other embodiments. Based on this embodiment, other embodiments obtained by those of ordinary skill in the art without any creative work are within the protection scope of the present disclosure.

What is claimed is:

1. A method for retransmitting at least one lost network packet based on a transport stream (TS) format and an user datagram protocol (UDP), comprising:
   receiving, by a terminal, a plurality of media packets having the TS format from a media server via the UDP;
   determining, by the terminal, whether CC field values recorded in CC fields of each of the plurality of media packets are continuous;
   transmitting, by the terminal, a transmission request packet to a media retransmission server via the UDP in response to the CC field values not being continuous, wherein the retransmission request packet comprises at least a portion of the content of each of the plurality of media packets, and each of the CC field values of each of the plurality of media packets;
   determining, by the media retransmission server, at least one lost media packet according to the content and the CC field values in the retransmission request packet;
   packaging, by the media retransmission server, the at least one lost media packet into a retransmission acknowledge packet; and
   transmitting, by the media retransmission server, the retransmission acknowledge packet from the media retransmission server to the terminal via the UDP.

2. The method of claim 1, wherein the step of determining, by the terminal, whether the CC field values recorded in the CC fields of each of the plurality of media packets are continuous comprises:
   determining, by the terminal, a target value range; and
   determining that the CC field values are not continuous when at least one CC field value is in the target value range but is not in the CC fields of the media packets.

3. The method of claim 2, wherein the CC field comprises 4 bits in length and a value of the CC field is within a range between 0 and 15.

4. The method of claim 3, wherein when a value of a CC field of a media packet exceeds 15, the value wraps around and becomes 0 again.

5. The method of claim 4, wherein the method further comprises:
   in response to the CC field values being continuous, determining, by the terminal, that media packets transmitted by the media server via the UDP has no lost packet.

6. The method of claim 2, wherein the media server and the media retransmission server are configured in the same server or are configured in different servers.

7. The method of claim 6, wherein the transmission request packet further comprises a REQU field, a Seq, an address and a port of the terminal for receiving the media server, and an address and a port of the terminal for transmitting the retransmission request packet; and
   wherein the REQU field represents the retransmission request packet, and the Seq is a number of times that the terminal transmits the retransmission request packet to the media retransmission server.

8. The method of claim 7, wherein the retransmission acknowledge packet comprises a RESP field, an ACK Seq, a Retran Total PacketNums, a Current Retran PacketNum, and a complete TS format media packet of the at least one lost media packet; and
   wherein the RESP field represents the retransmission acknowledge packet,
   the ACK Seq is an acknowledge packet to the Seq, and a value of the ACK Seq is equal to a value of the Seq,
   the Retran Total PacketNums indicates a number of segments of the retransmission acknowledge packet needs to be divided into in response to the retransmission request packet in order to be completely transmitted to the terminal; and
   the Current Retran PacketNum represents a current number of the Retran Total PacketNums.

9. The method of claim 7, wherein an address and a port of the media server are IP_src and IP_port;
   the address and the port of the terminal for receiving the media server are IP_dst and Port_dst;
   the address and the port of the terminal for transmitting the retransmission request packet are IP_client and Port_Dst+2;
   an address and a port of the retransmission media server are IP_retran and Port_retran;
   the terminal communicates with the media server through the address IP_dst and the port Port_dst; and
   the terminal communicates with the media retransmission server through the address IP_client and the port Port_Dst+2.

10. The method of claim 7, wherein an address and a port of the media server are IP_src and IP_port;
    the media retransmission server and the media server are adopt same address and port; and
    an address and a port that the terminal communicates with the media server and the media retransmission server are IP_dst and Port_dst.

11. A method for retransmitting at least one lost network packet based on a transport stream (TS) format and a user datagram protocol (UDP), comprising:
    receiving a plurality of media packets having the TS format by a terminal from a media server via the UDP;
    determining a target value range of continuity counter (CC) fields of the media packets, and obtaining a received CC field value range of the CC fields relating to the plurality of media packets;
    determining at least one lost media packet when the target value range is different from the received CC field value range;
    transmitting a transmission request packet to a media retransmission server by the terminal via the UDP upon determining the at least one lost media packet, wherein the retransmission request packet comprises at least a portion of the content of each of the plurality of media packets, and each of the CC field values of each of the plurality of media packets;
    determining, by the media retransmission server, the at least one lost media packet according to the content and the CC field values in the retransmission request packet;
    packaging, by the media retransmission server, the at least one lost media packet into a retransmission acknowledge packet; and
    transmitting, by the media retransmission server, the retransmission acknowledge packet from the media retransmission server to the terminal via the UDP.

12. The method of claim 11, wherein the step of determining the at least one lost media packet further comprises:
    determining at least one lost CC field value when at least one CC field value is in the target value range but is not in the received media packets.

13. The method of claim 12, wherein the CC field comprises 4 bits in length and a value of the CC field is within a range between 0 and 15.

14. The method of claim 13, wherein when a value of a CC field of a media packet exceeds 15, the value wraps around and becomes 0 again.

15. The method of claim 12, wherein the media server and the media retransmission server are configured in the same server or are configured in different servers.

16. The method of claim 15, wherein the transmission request packet further comprises a REQU field, a Seq, an address and a port of the terminal for receiving the media server, and an address and a port of the terminal for transmitting the retransmission request packet; and
    wherein the REQU field represents the retransmission request packet, and the Seq is a number of times that the terminal transmits the retransmission request packet to the media retransmission server.

17. The method of claim 16, wherein the retransmission acknowledge packet comprises a RESP field, an ACK Seq, a Retran Total PacketNums, a Current Retran PacketNum, and a complete TS format media packet of the at least one lost media packet; and
    wherein the RESP field represents the retransmission acknowledge packet,
    the ACK Seq is an acknowledge packet to the Seq, and a value of the ACK Seq is equal to a value of the Seq,
    the Retran Total PacketNums indicates a number of segments of the retransmission acknowledge packet needs to be divided into in response to the retransmission request packet in order to be completely transmitted to the terminal; and
    the Current Retran PacketNum represents a current number of the Retran Total PacketNums.

18. The method of claim 16, wherein an address and a port of the media server are IP_src and IP_port;
    the address and the port of the terminal for receiving the media server are IP_dst and Port_dst;
    the address and the port of the terminal for transmitting the retransmission request packet are IP_client and Port_Dst+2;
    an address and a port of the retransmission media server are IP_retran and Port_retran;
    the terminal communicates with the media server through the address IP_dst and the port Port_dst; and
    the terminal communicates with the media retransmission server through the address IP_client and the port Port_Dst+2.

* * * * *